A. BRIGDEN.
CULTIVATOR.
APPLICATION FILED JULY 16, 1908.
914,788.
Patented Mar. 9, 1909.
2 SHEETS—SHEET 1.
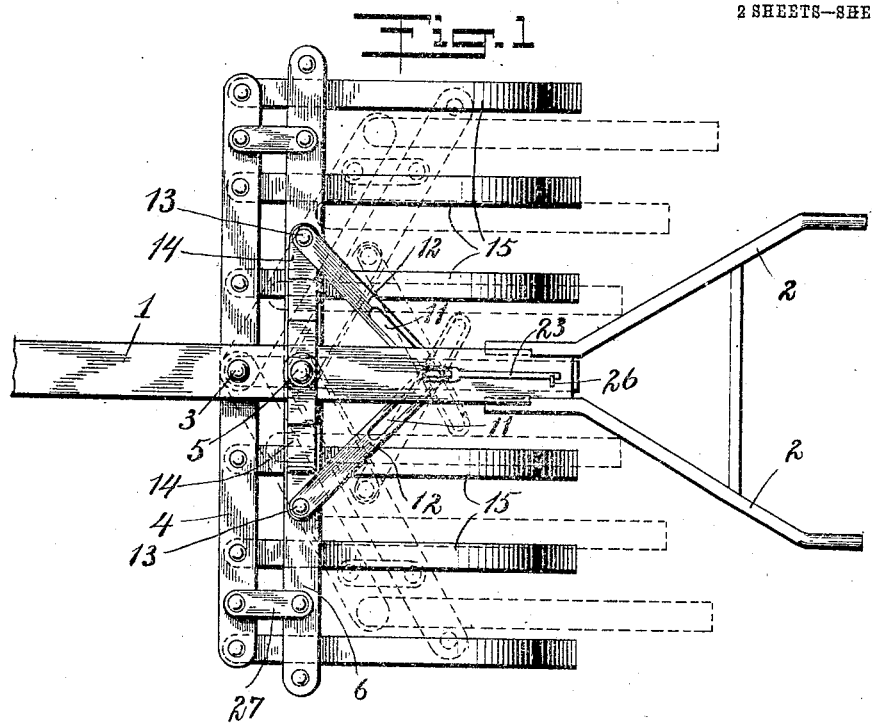
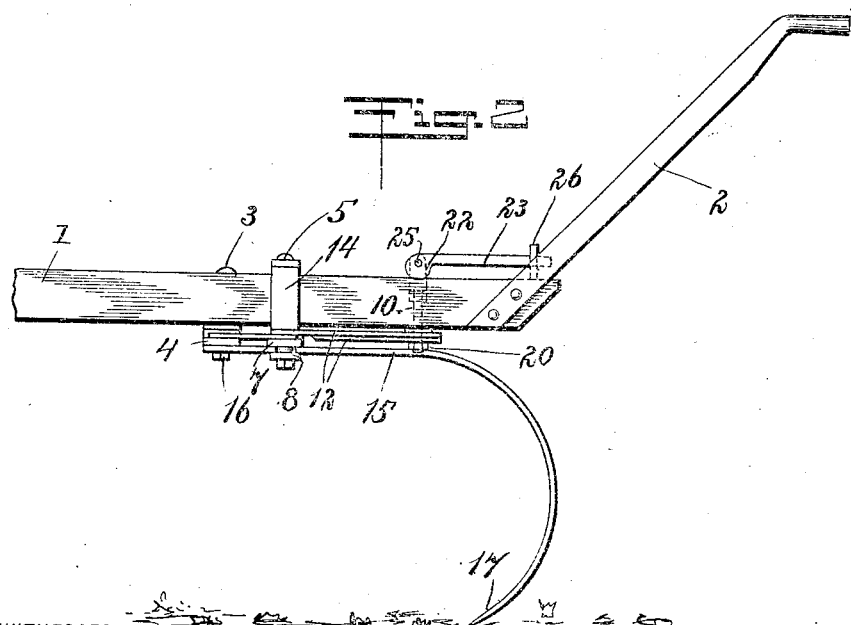
WITNESSES
INVENTOR
Arthur Brigden
BY
ATTORNEYS A. BRIGDEN.
CULTIVATOR.
APPLICATION FILED JULY 16, 1908.
914,788.
Patented Mar. 9, 1909
2 SHEETS—SHEET 2.
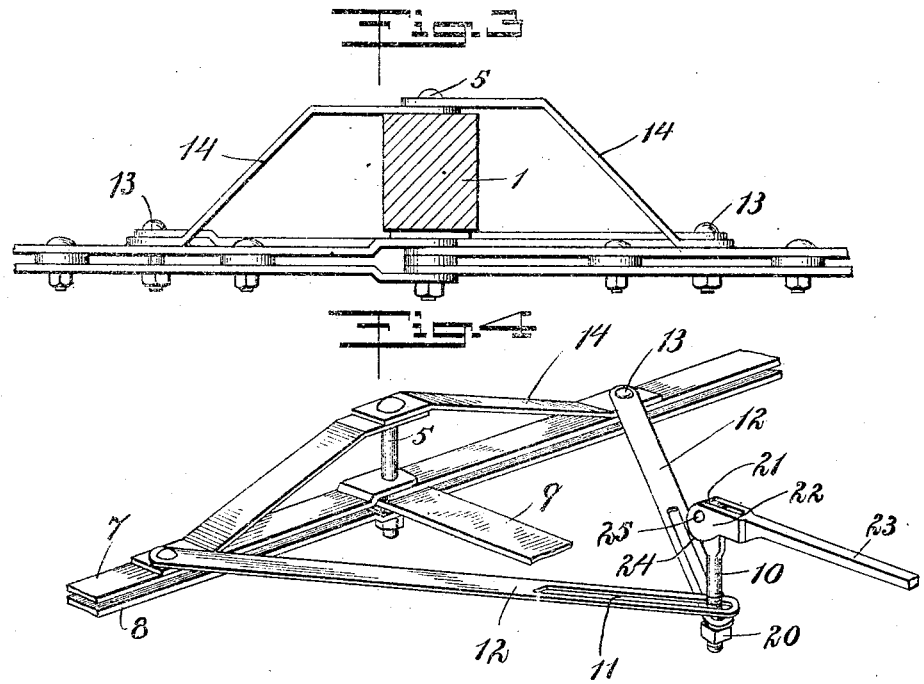
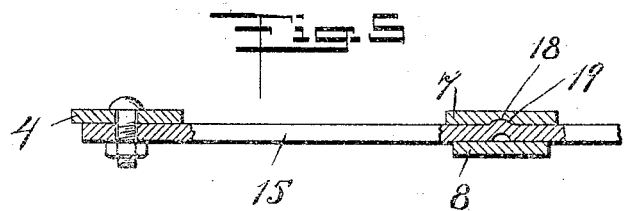
WITNESSES
INVENTOR
Arthur Brigden
BY
ATTORNEYS

UNITED STATES PATENT OFFICE.

ARTHUR BRIGDEN, OF ALBERTVILLE, ALABAMA.

CULTIVATOR.

No. 914,788.　　　Specification of Letters Patent.　　　Patented March 9, 1909.

Application filed July 16, 1903. Serial No. 443,808.

*To all whom it may concern:*

Be it known that I, ARTHUR BRIGDEN, a citizen of the United States, and a resident of Albertville, in the county of Marshall and State of Alabama, have invented a new and Improved Cultivator, of which the following is a full, clear, and exact description.

This invention relates to agricultural implements, and especially to cultivators.
The invention concerns itself particularly with the construction of cultivator which comprises a plurality of cultivator hoes having points adapted to till the ground, the forward parts of the hoes being attached to two cross bars arranged substantially parallel and transversely of the implement. With a cultivator of this general construction there is a tendency of the teeth of the hoes to become broken at their point of attachment to the rear cross bar.

The object of this invention is to provide an improved arrangement which will strengthen the construction at this point, and further to construct the parts in such a way that the hoes may be quickly adjusted with respect to the distance between them and rigidly secured in any desired relation.

The invention consists in the construction and combination of parts to be more fully described hereinafter and particularly set forth in the claims.

Reference is to be had to the accompanying drawings forming a part of this specification in which similar characters of reference indicate corresponding parts in all the figures.

Figure 1 is a plan of a cultivator constructed according to my invention, the forward portion of the pole being broken away, in this view parts of the cultivator are represented in dotted lines indicating the manner in which the relation of the hoes may be adjusted; Fig. 2 is a side elevation of the cultivator shown in Fig. 1, the forward portion of the pole being broken away; Fig. 3 is a vertical cross section taken through the pole just forward of the cultivator body, this view is upon an enlarged scale and shows the middle portion of the mechanism of the implement; Fig. 4 is a perspective of the parts shown in Fig. 3, certain parts being broken away; and Fig. 5 is a section taken longitudinally of one of the hoes and showing its manner of attachment to the cross bars referred to above, in this view the hoe is shown in cross section in the vicinity of the bar.

Referring more particularly to the parts, and especially to Figs. 1 and 2, 1 represents the pole of the implement, to which horses or other draft animals may be attached in any suitable manner. At the rear end of this pole handles 2 are attached, which enable the farmer to guide the implement in a well understood manner. Near the rear end the pole is provided with a vertical pivot bolt 3, and this bolt projects below the pole so as to enable the attachment of forward cross bars 4. These cross bars normally extend at right angles from the pole, so that they are disposed in the same straight line. Just to the rear of this pivot bolt 3 a pivot bolt 5 is provided, which also extends below the pole, and at the projecting end of this pivot bolt rear cross bars 6 are pivotally attached. These cross bars 6 are made double, as indicated in Figs. 3 and 4, that is, each of these cross bars is formed with an upper bar 7 and a lower bar 8, and the bars on the left-hand side of the implement are offset at their point of connection with the pole, as indicated in Fig. 4, so that the space between the bars on one side is the same as the corresponding space on the opposite side of the implement. Between the upper and lower bars a reach bar 9 extends rearwardly under the pole, and near its rear end a clamping bolt 10 passes downwardly through the pole and through this bar. This clamping bolt 10 also passes through longitudinal slots 11 which are formed in adjusting links 12. These links extend forwardly and incline outwardly toward the front of the implement, their forward ends being attached by pivot bolts 13 to the bars 6. These bolts 13 also afford means for attaching the ends of inclined brace plates 14, the upper ends of which are overlapped, as indicated in Fig. 3, and secured by the pivot bolt 5 to the upper side of the pole. In this way a very strong construction is produced for the bars 6, for it will be understood that the braces 14 tend to hold the outer ends of the bars 6 down and prevent their rising when an unusual pressure comes upon the outermost hoes.

The holes 15 have straight horizontal shanks, as indicated in Fig. 2, the forward ends of which are attached to the under side of the cross bars 4 by pivot bolts 16, as shown. The rear ends of the holes are bent downwardly so as to form points 17 which strike the ground line in a forwardly inclined position so as to cultivate the earth as the implement advances. The shanks of the hoes are not bolted to the rear cross bars, and instead of this, I provide the construction shown in Fig. 5. The shanks pass between the bars 7 and 8 and substantially fill the space therebetween. The upper bars 7 are pressed on the under side so as to form recesses or sockets 18, and the shanks of the hoes are pressed upwardly so as to form projections or buttons 19 which are received in the sockets, as shown. In this way a pivotal connection is formed at this point without reducing the cross section of the material, as would be necessary if the bolts were used at this point.

The rear end of the reach plate 9 lies between the links 12, and below the links the threads of the bolt 10 receive a clamping nut 20, as indicated most clearly in Fig. 4. The upper end of the bolt 10 is formed with a flat head 21, to which a cam 22 is pivotally attached, said cam being formed on the end of the clamping lever 23. The cam 22 has a cam edge 24, which is curved and eccentrically disposed with respect to the axis of the pivot bolt 25, which attaches the cam to the bolt. This cam edge 24 seats on the upper side of the pole, and the cam is designed in such a way that when the lever 23 is depressed to a substantially horizontal position, as shown in Fig. 2, the nut 20 of the bolt will firmly clamp the links 12 to the reach plate and the pole. I provide a catch or hook 26, which is secured in the upper side of the pole at the rear end thereof, and this hook projects laterally over the lever, as indicated in Fig. 1, so as to hold the lever down, as will be readily understood.

The forward cross bars 4 are connected with the rear cross bars 6 near the outer ends thereof by links 27, as indicated in Fig. 1. It will be evident that by releasing the cam lever 23 the rear ends of the links 12 will become free, so as to permit the cross bars 4 and 6 of the implement to be inclined toward the rear, as indicated by the dotted lines in Fig. 1. This reduces the width of the implement and concentrates the hoes. In this way the distance between the hoes may be readily adjusted and the cross bars secured rigidly in a position.

Having thus described my invention I claim as new and desire to secure by Letters Patent,—

1. A cultivator having a pole, cross bars pivotally attached to said pole and extending in opposite directions therefrom, hoes attached to said cross bars, a rotatable clamping bolt mounted in said pole, a cam lever attached to said clamping bolt, links pivotally attached to said cross bars and engaged by said clamping bolt to secure the same rigidly to said pole, and means fixed in the path of said cam lever for holding said cam lever in its clamping position.

2. A cultivator having a pole, forward cross bars, pivotally attached to said pole and extending in opposite directions therefrom, rear cross bars also attached to said pole and parallel with said first cross bars, links connecting said forward cross bars with said rear cross bars, hoes attached to said forward cross bars and said rear cross bars and extending rearwardly therefrom, links pivotally attached to a pair of said cross bars on opposite sides of said pole, said links having longitudinal slots therein, a rotatable clamping bolt mounted in said pole and passing through said slots, a cam lever attached to said pole and adapted to clamp the same to secure said last links rigidly thereto, and a hook attached on said pole lying in the path of said cam lever when rotated on the axis of said bolt, and engaging said cam lever to lock the same.

In testimony whereof I have signed my name to this specification in the presence of two subscribing witnesses.

ARTHUR BRIGDEN.

Witnesses:
C. D. RIGGS,
W. C. DAVIS.